July 25, 1961 S. H. DENGLE 2,993,591
AUTOMATIC DEFECTIVE ARTICLE EJECTOR APPARATUS
Filed Nov. 19, 1956 5 Sheets-Sheet 4
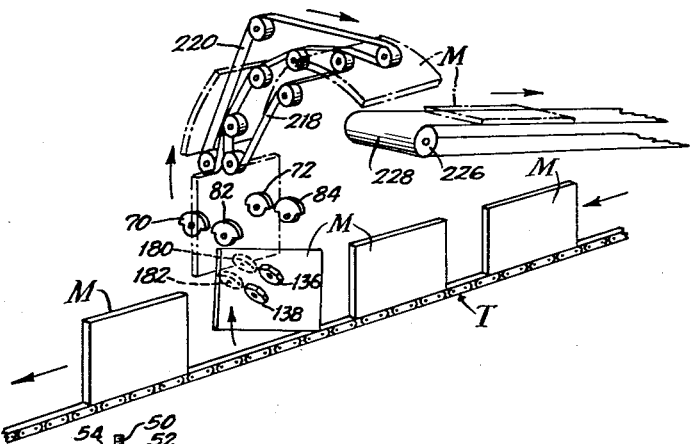
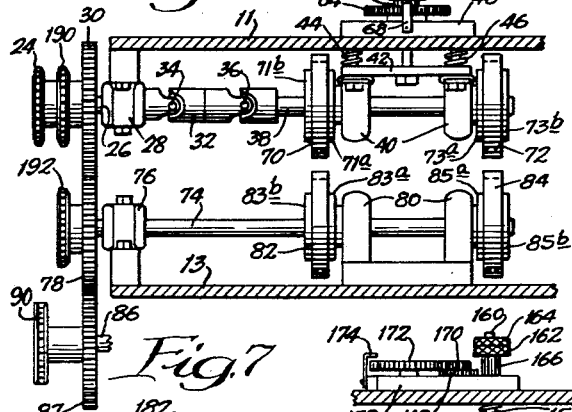
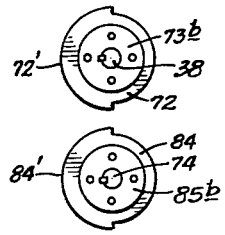
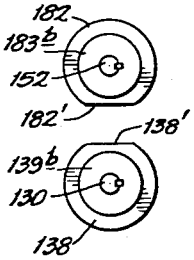
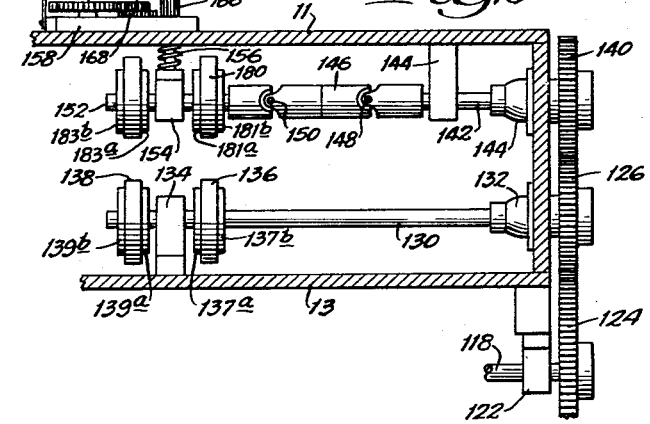
INVENTOR:
Sydney H. Dengle,
BY Bair, Freeman & Molinare
ATTORNEYS.

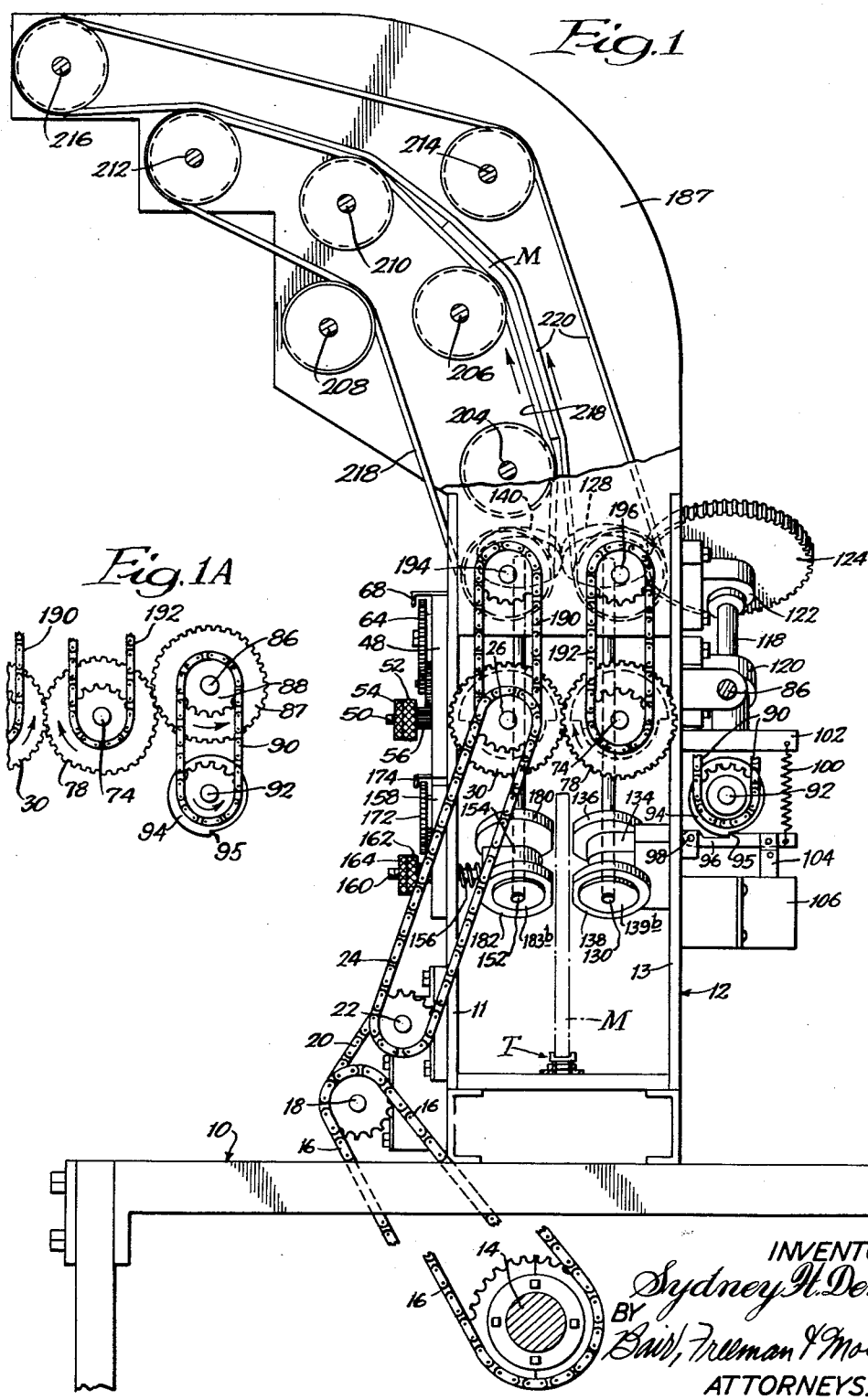

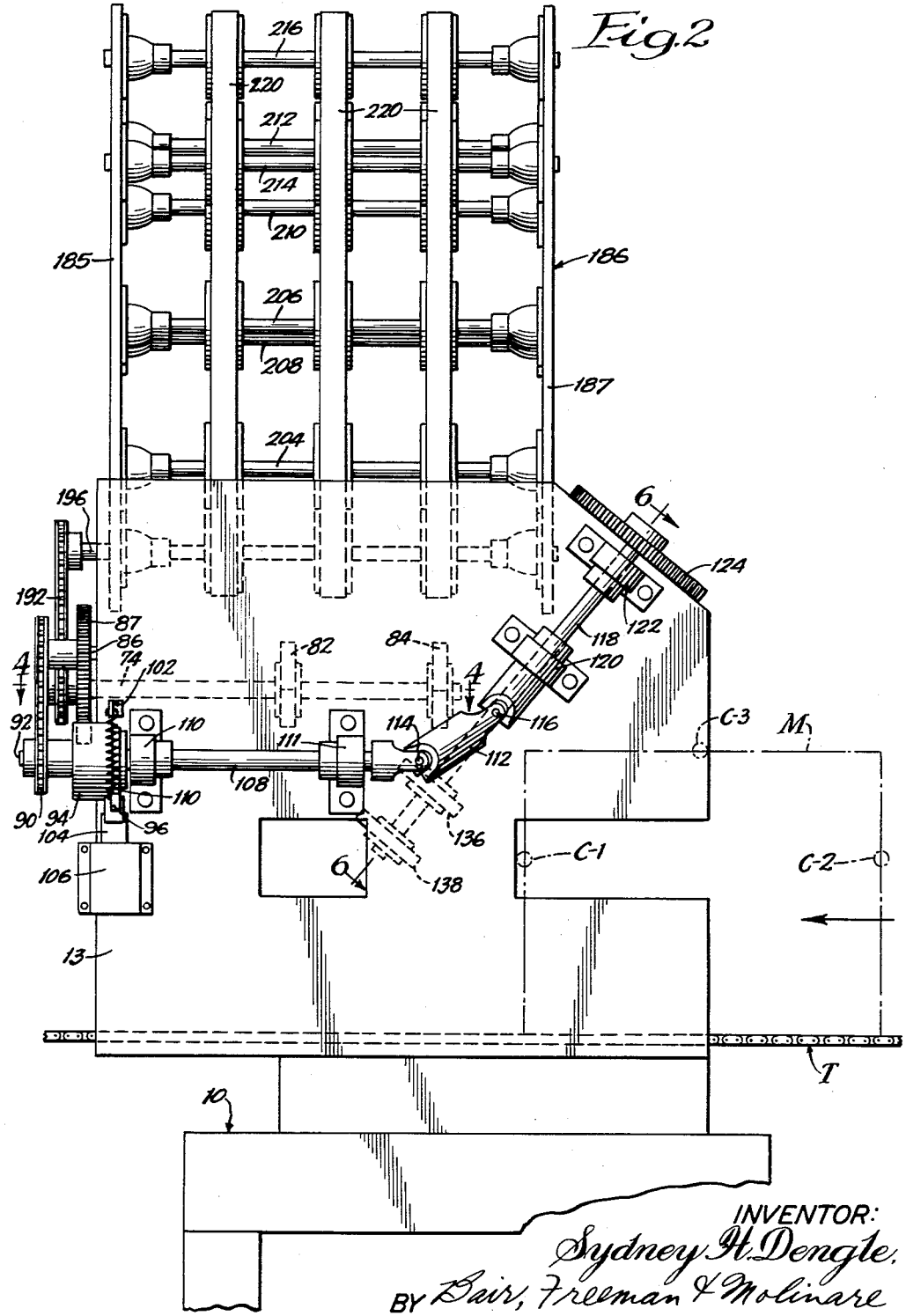

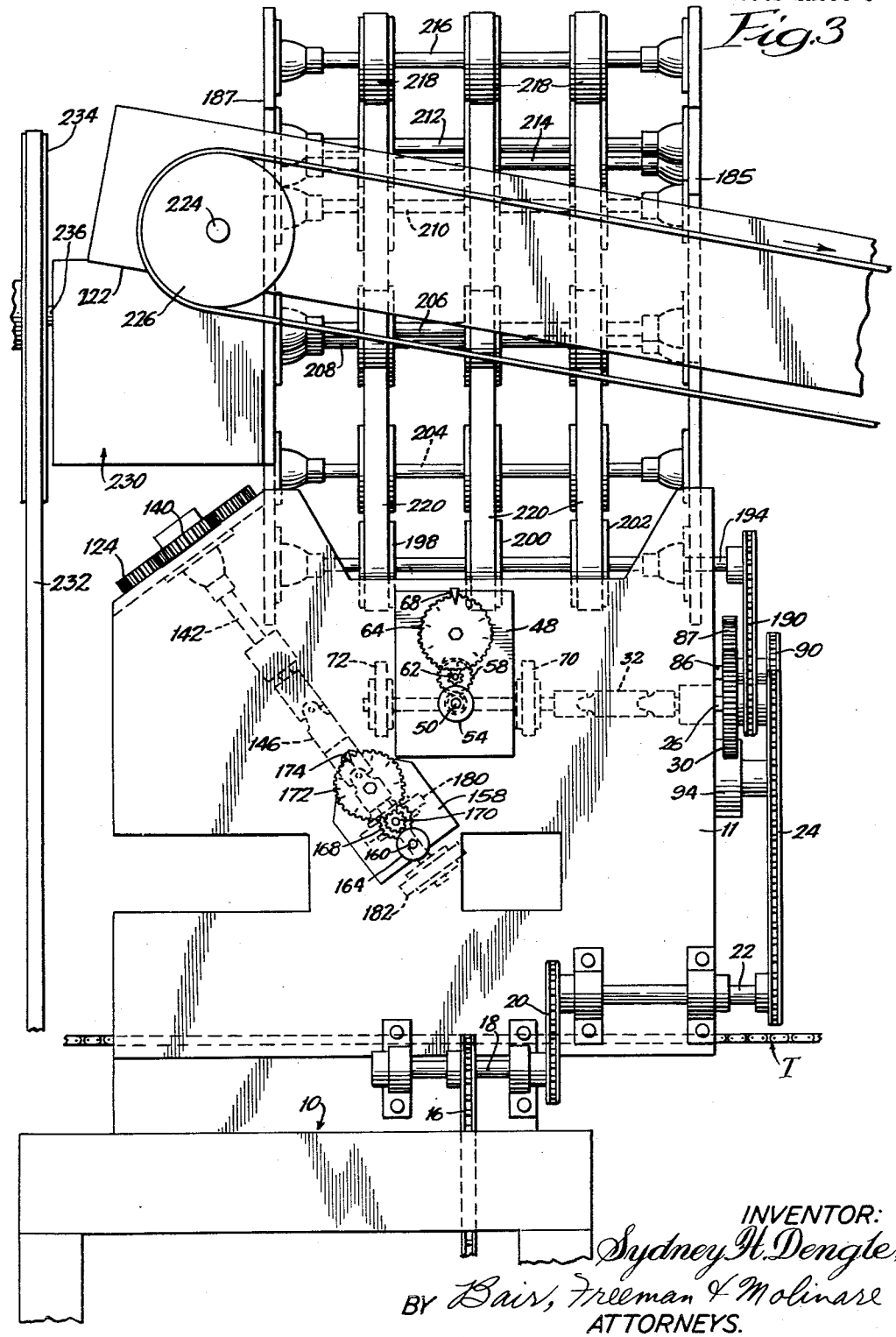

July 25, 1961 S. H. DENGLE 2,993,591
AUTOMATIC DEFECTIVE ARTICLE EJECTOR APPARATUS
Filed Nov. 19, 1956 5 Sheets-Sheet 5
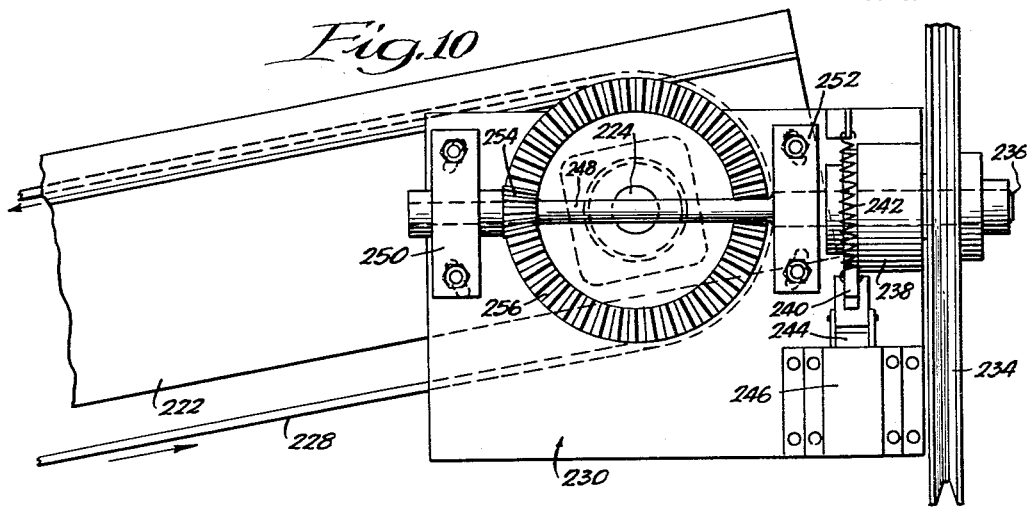
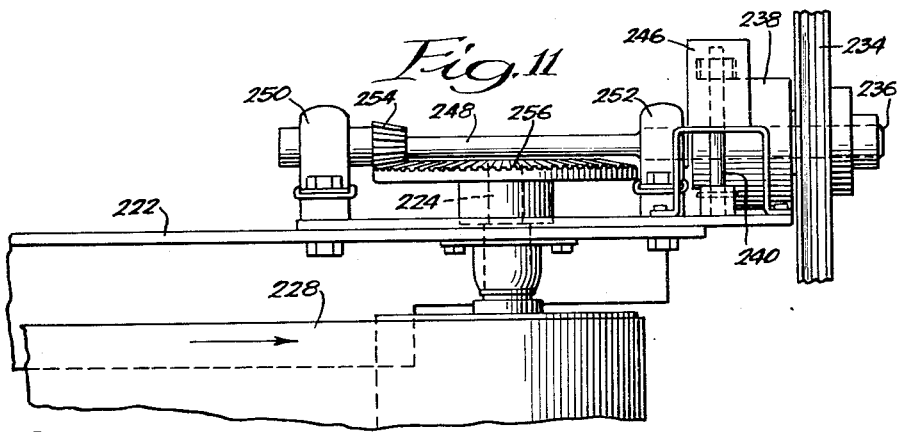
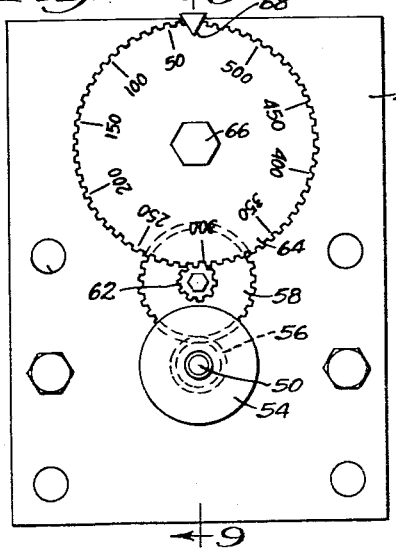
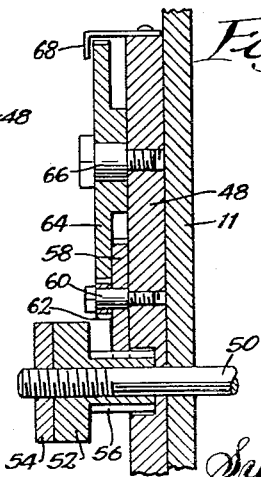
INVENTOR:
Sydney H. Dengle,
BY Bair, Freeman & Molinare
ATTORNEYS.

United States Patent Office 2,993,591
Patented July 25, 1961

2,993,591
AUTOMATIC DEFECTIVE ARTICLE EJECTOR APPARATUS

Sydney H. Dengle, Des Moines, Iowa, assignor to Meredith Publishing Company, Des Moines, Iowa, a corporation of Iowa
Filed Nov. 19, 1956, Ser. No. 623,004
10 Claims. (Cl. 209—74)

This invention relates generally to a defective article ejector apparatus, and more particularly to a novel automatic apparatus for elevating and removing defective magazines from a normal line of conveyor travel.

In the magazine publishing industry, magazine binding is generally performed by the side-stitched method. In accordance with conventional practices, the bindery receives the magazine contents in the form of a plurality of component sections comprising signatures, gate folds, inserts, and the cover. The signatures, gate folds and inserts are placed in the pockets of a gathering machine in predetermined consecutive sequence. The gathering machine selects and removes a single signature, gate fold or insert from its corresponding pocket in sequence, and places it on the track of a horizontal chain-driven conveyor, thereby assembling the contents of the final magazine. After the conveyor has moved past the required number of pockets, the complete magazine contents, with the exception of the cover, is then carried forward to the stitching and covering equipment. The conveyor track is customarily directed over a variety of jogging rollers or aligning means for placing the various component parts of the magazine in full edge alignment preparatory to gluing and stitching or stapling into a final assembled unit. Commonly, the magazine is stapled together with wire, and thereafter carried to a covering machine where the cover is folded around the stapled assembly and glued in place. The completed magazine is then transferred to a trimming machine for insuring conformance of all magazines to the desired predetermined size.

During this sequence of operations in the printing industry, a costly and troublesome problem arises because of occasional improper alignment of the magazine components prior to their transfer through the stitching and covering machinery. When such misaligned magazines occur, it has been necessary in the past to remove the cover, glue and staples, and re-introduce the magazine components to the stitching and covering machinery. It will be apparent that considerable economies and improved efficiency can be achieved if the removal of any magazine assembly containing a misaligned component can be insured prior to the stapling and covering operation.

It is a primary object of this invention, therefore, to provide an ejector apparatus automatically operative in response to the detection of a defective article, such as a misaligned magazine, to remove the article from the track of a conveyor prior to the performance of subsequent operations of a continuous system.

It is another object of this invention to provide a fully automatic ejector apparatus having primary ejector means operative to engage and carry a defective article in an upward and forward path out of a continuously moving conveyor track, so as to effect removal without risk of conflict with the conveyor or closely following articles carried upon the conveyor.

It is a further object of this invention to provide an ejector apparatus having secondary ejector means for effecting continued vertical elevation after initial removal of a mis-aligned article.

It is still another object of this invention to provide an ejector apparatus having adjustable ejector means for accommodating articles of various predetermined widths.

It is still a further object of this invention to provide an ejector apparatus having means for removing a defective article from a continuously moving conveyor track and delivering such article to a cooperating transfer mechanism for carrying the article to a conveniently remote point for deposit in overlapping sequence upon a cooperating receptor surface.

Further objects and advantages of this invention will become apparent as the following description proceeds and the features of novelty which characterize this invention will be pointed out with particularity in the claims annexed to and forming part of this specification.

FIGURE 1 is a front elevational view, with parts broken away and in section, showing the details of construction of an ejector apparatus embodying the principles of the present invention;

FIGURE 1A is a fragmentary detail showing parts removed in FIGURE 1;

FIGURE 2 is a side elevational view of the right hand side of the construction shown in FIGURE 1;

FIGURE 3 is a side elevational vew of the left hand side of the construction shown in FIGURE 1;

FIGURE 4 is a horizontal cross-sectional view taken substantially as indicated along the line 4—4 on FIGURE 2;

FIGURE 5 is an end view of the secondary ejection rollers, looking toward the right of FIGURE 4;

FIGURE 6 is an angularly inclined cross-sectional view taken substantially as indicated along the line 6—6 on FIGURE 2;

FIGURE 7 is an end view of the primary ejection rollers looking toward the left of FIGURE 6;

FIGURE 8 is an elevational view of the secondary ejection roller adjustment control;

FIGURE 9 is a vertical cross-sectional view taken substantially as indicated along the line 9—9 on FIGURE 8;

FIGURE 10 is a side elevational view showing the details of construction of the drive mechanism for the indexing take-away conveyor;

FIGURE 11 is a plan view looking upwardly from below FIGURE 10; and

FIGURE 12 is a more or less diagrammatic and perspective representation of the path of movement of an ejected defective magazine through the apparatus of the present invention.

Referring now more particularly to the drawing, FIGURES 1, 2 and 3 are best viewed as a grouping with FIGURE 2 being placed alongside and to the right of FIGURE 1, and FIGURE 3 being placed alongside and to the left of FIGURE 1. A base frame or supporting structure 10 provides a mounting for the machine of the present invention at a suitably convenient height above a plant floor. A superstructure frame, indicated generally at 12, is mounted upon the base frame 10, and includes left and right sides or templates 11 and 13. A main power shaft 14, driven by a motor or suitable power supply, is connected by means of a sprocket and chain assembly 16 to a first jack shaft 18. A sprocket and chain assembly 20 connects the first jack shaft 18 to a second jack shaft 22, which is in turn connected by a sprocket and chain assembly 24 to the outer shaft 26 of an adjustable secondary ejector assembly.

As best seen in FIGURE 4 of the drawing, the shaft 26 is supported at its forward end by a pillow-block 28, and carries a gear 30. The shaft 26 is coupled at its innner end to an intermediate shaft 32 by means of a universal joint 34. The shaft 32 is, in turn, coupled by a universal joint 36 to an inner shaft 38, which is supported in an adjustable manner upon pillow-blocks 40. A lock plate 42 is secured to the pillow-blocks 40, and fixedly carries a pair of spring loaded slider rods 44 and 46 which extend outwardly through the machine side 11. The slider rods 44 and 46 are biased to urge the shaft 38 inwardly away from the machine side 11. A guide block 48 is fixedly mounted on the outer surface of the machine side 11, and slidably receives the rods 44 and 46.

An adjusting rod 50 is secured at its inner end to the lock plate 42, and slidably extends through the machine side 11 and the guide block 48. The threaded outer end of the rod 50 carries a control knob or handwheel 52 (see FIGURES 8 and 9). A lock nut 54 permits locking of the adjusting screw 50 in a selected position. A pinion gear 56 is rigidly secured to the knob 52 in abutment against the guide block 48, and is threadedly rotatable about the adjusting rod 50. A gear 58 is rotatably carried by a pin 60 mounted on the guide block 48, and is in meshed engagement with the pinion gear 56, the latter being of sufficient axial length to maintain meshed engagement through substantial adjusting movement of the rod 50. A small diameter gear 62 is also carried by the pin 60, rotating with the gear 58, and is in meshed engagement with a large diameter indicator gear 64 rotatably mounted on a pin 66. The indicator gear 64 is provided with suitable calibrations upon its outer surface for indicating various adjusted positions of the screw 50, and a pointer 68 is provided for facilitating visual reading.

The inner shaft 38 serves to fixedly but removably mount a pair of secondary ejection rollers 70 and 72, pairs of inner and outer lock plates 71a, 71b and 73a, 73b being bolted to the respective rollers 70 and 72 and keyed to the shaft 38. It will be apparent that release of the lock nut 54 and manual rotation of the control knob 52 will effect axial movement of the adjusting rod 50, thereby moving the shaft 38 and the rollers 70 and 72 toward or away from the machine side 11, as desired. The universal couplings 34, 36 and the intermediate shaft 32 permit such adjustment to be performed independently of driving rotation and fixed mounting of the outer shaft 26.

A fixed shaft 74 is rotatably supported at its outer end by a fixed pillow-block 76 carried by the machine side 13. A gear 78, carried at the outer end of the shaft 74, meshingly engages the gear 30 of the adjacent shaft 26, and is driven thereby. A pair of pillow-blocks 80, also fixedly carried by the machine side 13 serve to rotatably support the inner end of the shaft 74. A pair of secondary ejection rollers 82 and 84 are mounted on the shaft 74, in the same manner as the pair of rollers 70 and 72, by means of inner and outer pairs of lock plates 83a, 83b and 85a, 85b.

As best seen in FIGURE 5, the cooperating double pairs of secondary rollers are of identical form, each having an enlarged cam surface, indicated at 72′ and 84′ on rollers 72 and 84, over 180° of their circumference. It will be apparent that as the rollers are rotatably driven the cam surfaces 72′ and 84′ will be moved into closely adjacent cooperating relation for effecting contacting engagement of a magazine therebetween. When the reduced diameter portions of the rollers are in opposite relation, sufficient clearance may be provided to permit free passage of a magazine thickness therebetween without resistance.

As best seen in FIGURES 1 and 1A, a gear and sprocket assembly provides a chain 90 which connects the fixed secondary roller shaft 74 to the shaft 92 of a one revolution clutch unit 94. A jack shaft 86 is supported in a suitable pillow block assembly on the frame 12, and serves to carry a gear 87 and a sprocket 88. Driving rotation of the roller shaft 74 is transmitted through the gear 87 to rotate the jack shaft 86 and sprocket 88, thereby driving the chain 90 and effecting reverse rotation of the clutch shaft 92. A suitable lock shoulder 95 of the clutch 94 cooperates with a trigger arm 96, pivoted at its one end 98 and biased upwardly at its other end by a spring 100 secured to a fixed bracket 102. The plunger 104 of a solenoid 106 is pivotally connected to the trigger arm 96 intermediate its pivot 98 and the spring 100. It will be apparent that upon energization of the solenoid 106, and downward withdrawal of its plunger 104, the trigger arm 96 will be released, and a single revolution of a clutch output shaft 108 effected. The shaft 108 is supported by suitable pillow-blocks 110 and 111. A connector shaft 112 and universal couplings 114 and 116 provide driving connection from the shaft 108 to a drive shaft 118. Pillow-blocks 120 and 122 rotatably support the shaft 118. A gear 124 is carried by the shaft 118 at its outer end and meshingly engages a drive gear 126 of a primary ejector fixed assembly.

Referring now more particularly to FIGURE 6, the gear 126 is carried by a shaft 130, which is rotatably mounted upon the machine side 13 by means of pillow-blocks 132 and 134. The shaft 130 rotatably mounts an axially fixed pair of nip rollers 136 and 138, having inner and outer pairs of lock plates 137a, 137b and 139a, 139b. The nip rollers 136 and 138 are fixedly located relative to a cooperating adjustable assembly having a gear 140 in meshed engagement with the gear 126. An outer shaft 142 mounts the gear 140, and is rotatably supported by fixed pillow-blocks 144. An intermediate shaft 146 is coupled to the inner end of the shaft 142 by a universal joint 148, and is in turn coupled by a universal joint 150 to an inner shaft 152. A pillow-block 154 rotatably supports the inner shaft 152, and is in turn carried by a spring loaded slider rod 156 in the manner of the adjustable assembly previously described in connection with FIGURE 4. Although a single pillow-block 154 has been shown, it will be understood that a dual support assembly of the type shown in FIGURE 4 may also be utilized.

A guide block 158 is mounted on the machine side 11, and serves to support an adjusting rod 160 having a control knob 162, lock nut 164, and pinion gear 166. A cooperating gear 168 is driven by the adjusting rod pinion 166 for transmitting rotation through a small gear 170 to a large indicator gear 172 having suitable calibrations and a cooperating pointer 174.

An adjustable pair of nip rollers 180 and 182 are carried by the shaft 152 in a fixed but removable manner, with suitable pairs of inner and outer lock plates 181a, 181b and 183a, 183b being provided. It will be apparent that the relative spacing between the adjustable pair of rollers 180, 182 and the fixed pair 136, 138 may be selectively predetermined in the same manner as the previously described adjustment of the secondary ejector rollers. As best seen in FIGURE 7, the adjustable and fixed pairs of primary rollers are of identical form, and are provided with flat portions, indicated at 138′ and 182′ on rollers 138 and 182, to provide a clearance space for free and unobstructed movement of a magazine of predetermined thickness therebetween. Upon rotation of the rollers to bring their arcuate surface portions into opposed relation, gripping engagement of a magazine thickness may be effected.

A transfer belt assembly frame 186, having sides or templates 185 and 187, is supported upon the superstructure 12. Sprocket and chain assemblies 190 and 192 serve to drivingly couple secondary ejector shafts 26 and 74 with a pair of parallel drive shafts 194 and 196 of the transfer belt assembly. As best seen in FIGURE 3, each of the shafts 194 and 196 carries a spaced group of three rollers 198, 200 and 202. These rollers are keyed to their respective shafts for longitudinal adjustment, and are fixedly positioned in matingly opposed pairs. A plurality of seven idler assemblies, each comprising a transverse shaft and three rollers, are provided by the transfer belt assembly and are indicated at 204 through 216, inclusive. The rollers carried by the drive shafts 194 and 196, and the various rollers of the seven idler assemblies, serve to drivingly mount a pair of sets of triple parallel belts, indicated at 218 and 220 respectively. The inner run portions of the belts 218 and 220 are disposed in closely adjacent opposed relation for engaging a magazine thickness therebetween and carrying it upwardly, in the direction indicated by the arrows on FIG- URE 1, for discharge at the upper end of the structure over the idler assembly 212.

An indexing conveyor assembly is mounted in cooperating relation adjacent the discharge end of the transfer belt assembly. Referring more particularly to FIGURE 3, an indexing frame 222 provides an inclined mounting structure for supporting a drive shaft 224 and roller 226 at its upper end, and a cooperating idler and take-up shaft and roller (not shown) at its lower end. A conveyor belt 228 is driven by the roller 226, and its upper surface provides a take-away platform for receiving ejected magazines thereon. An indexing drive unit 230 operates in automatic response to the initiation of a magazine ejection operation to move the conveyor belt 228 forward a predetermined distance, in the direction indicated by the arrow on FIGURE 3. In this way, a series of ejected magazines will be stacked in consecutive relation on the conveyor belt 228 for subsequent removal and re-delivery into the normal sequence of binding operations.

As best seen in FIGURES 10 and 11, a drive belt 232 and pulley 234 are provided, and may be continuously driven by a suitable power take-off from the main power shaft 14. A shaft 236 serves to mount the pulley 234, and is coupled with a one revolution clutch 238. A trigger 240 and spring 242 are arranged in the manner of the clutch unit 94, so as to permit one revolution of an output shaft 248 in response to energization of a solenoid 246 and withdrawal of its plunger 244.

The shaft 248 is supported for rotation by suitable pillow-blocks 250 and 252, and carries at its free end a small bevel gear 254, which meshingly engages a large bevel gear 256. The gear 256 is carried by the drive shaft 224. It will be apparent that upon energization of a solenoid 246, the bevel gear 254 will be driven through a single complete revolution so as to rotate the shaft 224 and its roller 226 through a minor arc, thereby driving the conveyor belt 228 forwardly a small predetermined distance.

*Practical operation*

The magazine ejector apparatus of the present invention may be conveniently viewed as comprising five main structural portions. First, a base frame and related superstructure; second, a primary ejector assembly; third, a secondary ejector assembly; fourth, a transfer belt assembly; and last, an indexing conveyor assembly. It is contemplated that the ejector apparatus will be automatically actuated by means of a suitable cooperating detector mechanism. Such a mechanism is disclosed in the copending W. H. Stone and D. W. Watson application Serial No. 635,156, filed January 22, 1957, and having a common assignee with the present invention. In FIGURES 1 and 2 of the drawing, a magazine M has been indicated in phantom edge and side outline, respectively. The magazine M is of typical form, characterized by a rectangular side area of desired dimensions and a predetermined thickness which is quite small in relation to the face area dimensions. The locations of photoelectric cells for detecting a misaligned magazine are also diagrammatically illustrated in phantom outline on FIGURE 2, and are designated C–1, C–2 and C–3. The cell locations are merely arbitrary for purposes of discussing the operation of the present invention, and are not intended to indicate any preferred or necessary embodiment. The cells C–1 and C–2 are intended to designate means for detecting a magazine having one of its components out of alignment with the others so as to create a greater than normal magazine length. Similarly, a cell C–3 is intended to designate means for detecting a magazine of excessive width, although in ordinary practice such errors may be corrected after binding by a trimming operation. Once a misaligned magazine has been detected, it is contemplated that the photoelectric cells shall operate to close a suitable electrical circuit, and thereby energize the solenoid 106 of the primary ejector assembly and the solenoid 246 of the indexing conveyor assembly.

The ejector apparatus of this invention is mounted so as to straddle a continuously-driven horizontal track T and cooperating roller chain drive (see FIGURE 1), which is carrying assembled magazines toward a stitching and covering operation. The ejector apparatus is positioned in such a manner that the primary ejector rollers straddle the track carried magazines, while at the same time allowing magazines to pass below the secondary ejector rollers. When properly aligned magazines are being carried along the track T, the primary rollers 136, 138 and 180, 182 will be positioned with their flat portions in opposed alignment, so as to permit free passage of a magazine width therebetween. Upon detection of a misaligned magazine, an ejection cycle will be initiated by energization of the solenoid 106. The primary ejector rollers will be driven through one revolution, bringing their arcuate portions into closely adjacent relation for positively gripping the misaligned magazine therebetween.

As best seen in schematic sequence in FIGURE 12 of the drawing, the primary ejector rollers engage the defective magazine and lift it upwardly out of the track T, while at the same time imparting a horizontal velocity component which is greater than the horizontal driving speed of the conveyor roller chain, thereby providing a sufficient relative horizontal movement so as to insure clearance of the magazine and prevent dragging on the portion of the conveyor roller chain which normally engages the magazine rear edge to carry it along the track. This operation is enabled because of the mounting of the primary rollers along drive shafts which are disposed at a forward and downward inclination of at least about 45°, thereby orienting the rollers for rotation in planes which are directed forwardly and upwardly (see FIGURE 2).

When the magazine has been lifted the required distance for effecting its removal from the conveyor track T, the primary ejector rollers will have rotated around to their flat portions, thereby releasing the magazine. Simultaneously, the magazine will have been engaged by the enlarged contact surfaces of the secondary ejector rollers. The secondary rollers operate to arrest the forward movement of the magazine while maintaining the vertical component of velocity that has been imparted to it by the primary ejector rollers. The secondary ejector rollers serve to elevate the magazine into the transfer belt assembly, which thereafter engages and carries the magazine upwardly and over for discharge onto the indexing conveyor.

During this sequence of elevating and transfer operations on the magazine, the solenoid 246 has also been actuated so as to effect an indexing movement of the conveyor belt 228, thereby insuring the placing of a sequence of ejected magazines in a conveniently overlapped manner on the take-away conveyor.

In actual practice, magazines will vary in length, width and most particularly thickness from one publication run to another, as for example the wide variations in width which occur from issue to issue of the average monthly magazine. These varying factors of dimension may be readily compensated for by adjusting the location of the photocells in accordance with the different length and width requirements of each production run, and by adjusting the spaced separation of the primary and secondary rollers to insure gripping engagement of the particular magazine thickness being encountered. As previously described, adjustment for thickness is readily accommodated by manual selective turning of the control knobs 52 and 162 to a suitably calibrated new position.

Although the apparatus of the present invention has been described in connection with side stitched magazines as the specific article, it will be understood that the principles of operation are equally applicable to any article handling process requiring the ejection of a preselected article of generally flat and regular shape. Changes may be made in the construction and arrangement of the parts of my Automatic Defective Article Ejector Apparatus without departing from the real spirit and purpose of my invention, and it is my intention to cover by the claims any modified forms of structure or use of mechanical improvements which may be reasonably included within their scope.

What I claim as new and desire to obtain by Letters Patent of the United States is:

1. An ejector apparatus for magazine-type articles, said articles being characterized by side areas of predetermined desired dimensions and by a relatively small thickness, comprising means defining a generally horizontal conveyor level along which a series of said articles are adapted to be moved forwardly past an ejector station, said articles being supported on edge with the side areas thereof in generally vertical orientation ejector means automatically operative in response to detection of a predetermined condition of an irregularity in the side area dimensions of an article prior to its reaching said ejector station simultaneously to engage opposite sides of such article at said station and grippingly elevate it in an upward and forward direction relative to said conveyor level, whereby said article is removed relative to subsequent following articles.

2. An ejector apparatus for magazine-type articles, said articles being characterized by side areas of predetermined desired dimensions and by a relatively small thickness, comprising means defining a generally horizontal conveyor level along which a series of said articles are adapted to be moved forwardly past an ejector station, said articles being supported on edge with the side areas thereof in generally vertical orientation ejector means automatically operative in response to detection of a predetermined condition of an article prior to its reaching said ejector station simultaneouly to engage opposite sides of such article at said station, said ejector means comprising a primary ejector operative to engage and grippingly elevate an article to be ejected and carry it in an upward and forward direction relative to said conveyor level, and a secondary ejector disposed above said primary ejector and operative to receive an ejected article from said primary ejector and grippingly elevate it further upwardly, whereby said article is removed relative to subsequent following articles.

3. An ejector apparatus for magazine-type articles, said articles being characterized by side areas of predetermined desired dimensions and by a relatively small thickness, comprising means defining a generally horizontal conveyor level along which a series of said articles are adapted to be moved forwardly past an ejector station, said articles being supported on edge with the side areas thereof in generally vertical orientation, ejector means automatically operative in response to detection of a predetermined condition of an irregularity in the side area dimensions of an article prior to its reaching said ejector station simultaneously to engage opposite sides of such article at said station and grippingly el vate it in an upward and forward direction relative to said conveyor level, whereby said article is removed relative to subsequent following articles, said ejector means being laterally adjustable for operation with articles of various predetermined widths.

4. An ejector apparatus for magazine-type articles, said articles being characterized by side areas of predetermined desired dimensions and by a relatively small thickness, comprising means defining a generally horizontal conveyor level along which a series of said articles are adapted to be moved forwardly past an ejector station, said articles being supported on edge with the side areas thereof in generally vertical orientation, ejector means automatically operative in response to detection of a predetermined condition of an irregularity in the side area dimensions of an article prior to its reaching said ejector station to engage such article at said station, said ejector means comprising a primary ejector operative simultaneously to engage opposite sides of an article to be ejected and grippingly carry it in an upward and forward direction relative to said conveyor level, and a secondary ejector disposed above said primary ejector and operative to receive an ejected article from said primary ejector and simultaneously engage opposite sides thereof and grippingly elevate it further upwardly, whereby said article is removed relative to subsequent following articles, said primary and secondary ejectors each being independently laterally adjustable for operation with articles of various predetermined widths.

5. An ejector apparatus for magazine-type articles, said articles being characterized by side areas of predetermined desired dimensions and by a relatively small thickness, comprising means defining a generally horizontal conveyor level along which a series of said articles are adapted to be moved forwardly past an ejector station, said articles being supported on edge with the side areas thereof in generally vertical orientation, ejector means including spaced rollers mounted for driving rotation about generally parallel inclined axes, said ejector means being automatically operative in response to detection of a predetermined condition of an irregularity in the side area dimensions of an article prior to its reaching said ejector station simultaneously to effect engagement by said rollers of opposite sides of such article at said station and grippingly elevate it in an upward and forward direction relative to said conveyor level, whereby said article is removed relative to subsequent following articles.

6. An ejector apparatus for magazine-type articles, said articles being characterized by side areas of predetermined desired dimensions and by a relatively small thickness, comprising means defining a generally horizontal conveyor level along which a series of said articles are adapted to be moved forwardly past an ejector station, said articles being supported on edge with the side areas thereof in generally vertical orientation, ejector means including spaced rollers mounted for driving rotation about generally parallel inclined axes, said ejector means being automatically operative in response to detection of a predetermined condition of an irregularity in the side area dimensions of an article prior to its reaching said ejector station to engage opposite sides of such article at said station and elevate it in an upward and forward direction relative to said conveyor level, whereby said article is removed relative to subsequent following articles, one of said rollers being laterally adjustable relative to the other for operation with articles of various predetermined widths.

7. An ejector apparatus for magazine-type articles, said articles being characterized by side areas of predetermined desired dimensions and by a relatively small thickness, comprising means defining a generally horizontal conveyor level along which a series of said articles are adapted to be moved forwardly past an ejector station, said articles being supported on edge with the side areas thereof in generally vertical orientation, ejector means automatically operative in response to detection of a predetermined condition of an irregularity in the side area dimensions of an article prior to its reaching said ejector station to engage such article at said station, said ejector means comprising a primary ejector including spaced rollers mounted for driving rotation about generally parallel inclined axes and operative to engage opposite sides of an article to be ejected and carry it in an upward and forward direction relative to said conveyor level, and a secondary ejector disposed above said primary ejector including spaced rollers mounted for driving rotation about horizontal axes and operative to receive an ejected article from said primary ejector and engage opposite sides thereof and elevate it further upwardly, whereby said article is removed relative to subsequent following articles, one of said rollers of each of said ejectors being laterally adjustable relative to the other for operation with articles of various predetermined widths.

8. An ejector apparatus for magazine-type articles, said articles being characterized by side areas of predetermined desired dimensions and by a relatively small thickness, comprising means defining a generally horizontal conveyor level along which a series of said articles are adapted to be moved forwardly along a path of travel and past an ejector station, said articles being supported on edge with the side areas thereof in generally vertical orientation, ejector means automatically operative in response to detection of an irregularity in the side area dimensions of an article prior to its reaching said ejector station, said ejector means including normally stationary rollers spaced in opposed relation at each side of said path of travel and having reduced surface portions defining a clearance space through which the thickness of said articles may freely pass, said rollers being mounted for driving rotation about generally parallel axes, whereby upon rotation of said rollers to bring their enlarged surface portions into opposed proximity said clearance space is closed and an article therebetween is engaged at its opposite sides and elevated in an upward direction relative to said conveyor level, whereby said article is removed relative to subsequent following articles.

9. An ejector apparatus for magazine-type articles, said articles being characterized by side areas of predetermined desired dimensions and by a relatively small thickness, comprising means defining a generally horizontal conveyor level along which a series of said articles are adapted to be moved forwardly along a path of travel and past an ejector station, said articles being supported on edge with the side areas thereof in generally vertical orientation, ejector means automatically operative in response to detection of an irregularity in the side area dimensions of an article prior to its reaching said ejector station, said ejector means including normally stationary rollers spaced in opposed relation at each side of said path of travel, and having reduced surface portions defining a clearance space through which the thickness of said articles may freely pass, said rollers being mounted for driving rotation about generally parallel inclined axes, whereby upon rotation of said rollers to bring their enlarged surface portions into opposed proximity said clearance space is closed and an article therebetween is engaged at its opposite sides and elevated in an upward and forward direction relative to said conveyor level, whereby said article is removed relative to subsequent following articles.

10. An ejector apparatus for magazine-type articles, said articles being characterized by side areas of predetermined desired dimensions and by a relatively small thickness, comprising means defining a generally horizontal conveyor level along which a series of said articles are adapted to be moved forwardly in vertical alignment past an ejector station, said articles being supported on edge with the side areas thereof in generally vertical orientation, ejector means automatically operative in response to detection of an irregularity in the side area dimensions of an article prior to its reaching said ejector station to engage such article at said station, said ejector means comprising a primary ejector operative to engage and elevate an article to be ejected and carry it in vertical alignment in an upward and forward direction relative to said conveyor level, and a secondary ejector disposed above said primary ejector and operative to receive an ejected article from said primary ejector and elevate it further upwardly, whereby said article is removed relative to subsequent following articles, transfer means disposed above said secondary ejector and operative to receive an ejected article and carry it upwardly and laterally for discharge in horizontal alignment, and a take-away conveyor disposed to receive an ejected article from said transfer means, said take-away conveyor being automatically indexed in response to actuation of said ejector means.

References Cited in the file of this patent

UNITED STATES PATENTS

| | | |
|---|---|---|
| 1,814,633 | Ryder et al. | July 14, 1931 |
| 1,846,808 | Hohn et al. | Feb. 23, 1932 |
| 1,900,633 | Buchner | Mar. 7, 1933 |
| 2,240,562 | Lake | May 6, 1941 |
| 2,355,079 | Jones | Aug. 8, 1944 |
| 2,433,685 | Dowell | Dec. 30, 1947 |
| 2,499,439 | Winters | Mar. 7, 1950 |
| 2,570,288 | Todd | Oct. 9, 1951 |
| 2,719,629 | Robinson | Oct. 4, 1955 |